United States Patent
Eidler et al.

(12)

(10) Patent No.: US 6,261,714 B1
(45) Date of Patent: Jul. 17, 2001

(54) SPILL AND LEAK CONTAINMENT SYSTEM FOR ZINC-BROMINE BATTERY

(75) Inventors: Phillip A. Eidler, Muskego; Peter J. Lex, Wauwatos, both of WI (US)

(73) Assignee: ZBB Technologies, Inc., Wauwatosa, WI (US)

(*) Notice: Subject to any disclaimer, the term of this patent is extended or adjusted under 35 U.S.C. 154(b) by 0 days.

(21) Appl. No.: 09/304,357

(22) Filed: May 4, 1999

Related U.S. Application Data

(60) Provisional application No. 60/084,386, filed on May 6, 1998.

(51) Int. Cl.$^7$ .................................................. H01M 2/36
(52) U.S. Cl. .................................. 429/70; 429/71; 429/72
(58) Field of Search .............................. 429/70, 71, 72, 429/74, 81, 67, 95, 84

(56) References Cited

U.S. PATENT DOCUMENTS

| | | |
|---|---|---|
| 467,372 | 1/1892 | Gendron . |
| 1,354,800 | 10/1920 | Butler . |
| 2,346,313 | 4/1944 | Keller . |
| 2,584,117 | 2/1952 | Elrod, Jr. . |
| 3,357,860 | 12/1967 | Stachurski . |
| 3,900,640 | 8/1975 | Vechiotti . |
| 3,928,078 | 12/1975 | Köthe et al. . |
| 3,966,870 | 6/1976 | Vecchiotti . |
| 3,993,507 | 11/1976 | Hardigg . |
| 4,304,823 | 12/1981 | Lemelson . |
| 4,491,625 | 1/1985 | Kantner . |
| 4,550,065 * | 10/1985 | Fujii et al. ............................ 429/105 |
| 4,614,693 * | 9/1986 | Hashimoto et al. .................... 429/72 |
| 4,614,694 | 9/1986 | Manthis . |
| 4,663,251 * | 5/1987 | Sasaki et al. ........................... 429/29 |
| 5,168,016 * | 12/1992 | Hashimoto et al. .................... 429/27 |
| 5,498,488 * | 3/1996 | Stocchiero ............................. 429/72 |
| 5,543,243 | 8/1996 | Brecht . |
| 5,601,943 | 2/1997 | Eidler et al. . |
| 5,607,788 | 3/1997 | Tomazic . |
| 5,610,802 | 3/1997 | Eidler et al. . |
| 5,813,838 | 9/1998 | Bae et al. . |
| 5,862,830 | 1/1999 | Landau . |

* cited by examiner

Primary Examiner—Gabrielle Brouillette
Assistant Examiner—M. Wills
(74) Attorney, Agent, or Firm—Nicholas A. Kees; Godfrey & Kahn, S.C.

(57) ABSTRACT

A spill and leak containment system for a liquid electrolyte battery such as a zinc-bromine battery. The system includes one-piece, electrolyte reservoirs with pump mountings and other openings positioned at or near the tops of each reservoir. Positioning the openings at the tops of the reservoirs reduces the amount of electrolyte that might spill out of them, in the event of a leak or breach in the seal between the opening and the component mounted therein. The pump openings are surrounded by sumps, which will catch and contain liquid if there is a leak. To help contain vapor leaks, the invention also includes a vapor recovery system coupled to reservoir when it is filled with or emptied of electrolyte. The vapor recovery system allows for an exchange of vapors to occur between an electrolyte container and the battery reservoir while electrolyte fluid is being transferred. This prevents electrolyte vapor from escaping into the atmosphere where it might be potentially harmful to personnel setting up the system. A pressure equalization system is also provided in order to equalize the pressure between the anolyte and catholyte reservoirs.

13 Claims, 5 Drawing Sheets

SPILL AND LEAK CONTAINMENT SYSTEM FOR ZINC-BROMINE BATTERY

CROSS-REFERENCE TO RELATED APPLICATIONS

This application claims the benefit of U.S. Provisional Application Ser. No. 60/084,386, filed May 6, 1998.

FIELD OF THE INVENTION

The present invention relates generally to energy storing devices, such as batteries. More particularly, the present invention relates to a spill and leak containment system for zinc-bromine batteries, which are often used in transportable energy storage systems.

BACKGROUND OF THE INVENTION

Large-scale energy storage systems can be created by coupling a number of energy storing devices such as batteries to one another. Such systems are useful for storing power during off-peak times and supplying electric power to an electric power transmission system during times of peak usage. This process is known as "peak shaving." A system that can be used to accomplish peak shaving is shown in U.S. Pat. No. 5,610,802 (the "'802 Patent").

Systems such as the one in the '802 Patent are most often implemented with metal-halogen batteries such as zinc bromine batteries. While zinc-bromine batteries have several advantages over other types of batteries, most such batteries suffer from bromine leakage problems. Bromine leakage causes power losses and corrosion and handling problems. Handling problems can be particularly troublesome since bromine is hazardous to both plants and animals.

Often times bromine leaks occur through battery vents which are provided to allow the internal pressure to equalize with the ambient pressure outside the battery, and for the escape of gases that build up inside the battery. However, vents equipped with scrubbers can reduce the effects of such leaks. More troublesome are leaks which occur in the battery components due to improper sealing or joining. These leaks are often compounded when batteries or modules containing batteries are transported, as the motion and vibration associated with such movement tends to further separate imperfect joints and seals in a battery.

In response to these problems, methods of strongly sealing the electrodes and separators used to create the electrochemical cells in zinc-bromine batteries have been developed. However, other components such a pump mounts, plumbing, and reservoirs may be imperfectly sealed, joined, or constructed and leak bromine, whether in a liquid or gaseous form. To date, most attempts to address such leaks have focused on providing sumps and other basins to catch and collect liquid bromine. However, these attempts have not been completely effective. Thus, there is a need for improved designs that reduce and prevent spills and leaks of bromine from zinc-bromine batteries.

SUMMARY OF THE INVENTION

Therefore, an object of the present invention is to provide a bromine containment system for a zinc-bromine battery. Another object is to provide a bromine vapor containment system that reduces bromine emissions from a battery module.

These and other objects and advantages are achieved in a battery module which includes one-piece, electrolyte reservoirs. Constructed in such a fashion, the reservoirs in the present invention exhibit improved structural integrity over prior-art reservoirs that have seams, welds, or other junctures as a result of being manufactured from multiple components. In the preferred embodiment, the reservoirs are blow molded from high density polyethylene in a rotational fashion.

In addition to their one-piece design, the reservoirs in the present invention are designed with pump mountings or openings positioned near their tops. The pump openings are surrounded by sumps. Positioning the pump openings near the top of each reservoir reduces the amount of electrolyte that might spill out of the reservoirs in the event of a leak or breach in the seal between the pumps and pump openings. If there is a leak, the sumps contain the small amount spilled.

Each of the rotational molded reservoirs also includes one or two raised cylindrical openings mounted in a non-sump area that provide access to the interior of the reservoir. The openings are sealed with lids, which may have their own openings or ports for plumbing and other connections. Positioning the openings on the top of the reservoirs, instead of the sides or bottom, helps reduce the amount of liquid which may leak from the reservoirs in the event of a leak from or breach of the lids. In order to further reduce the leakage of vapor and liquid, the lids are fitted with one or two O-rings to provide an air tight seal.

Other features of the invention involve the sensors and ports on the reservoir. A float sensor is positioned within each electrolyte reservoir in order to monitor the electrolyte level. A controller (such as a microprocessor) monitors the levels and in the event of a non-normal level, the system shuts down until the unbalanced condition has been corrected. Ports in the lids for the cylindrical openings are used for filling the system with electrolyte and balancing the pressure of the system. In order to balance pressure in the system, a pressure equalization tube is coupled to the electrolyte reservoirs. Specifically, the tube is connected from the anolyte reservoir to the catholyte reservoir in order to equalize the pressure in the two electrolyte systems. This helps maintain an equal pressure in each of them. Furthermore, a fill tube can be coupled to electrolyte fill containers when each of the electrolyte reservoirs is being initially filled. This tube acts as a vapor transport tube and allows for the exchange of vapors to occur between the electrolyte container and the battery reservoir while electrolyte fluid is being transferred. This prevents electrolyte vapor from escaping into the atmosphere where it might be potentially harmful to personnel setting up the system.

Other features and advantages of the present invention will become apparent by reference to the detailed description below taken in combination with the accompanying drawings.

BRIEF DESCRIPTION OF THE DRAWINGS

Throughout the following views, reference numerals will be used on the drawings, and the same reference numerals will be used throughout the several views and in the description to indicate same or like parts of the invention.

DETAILED DESCRIPTION

Figure 1:
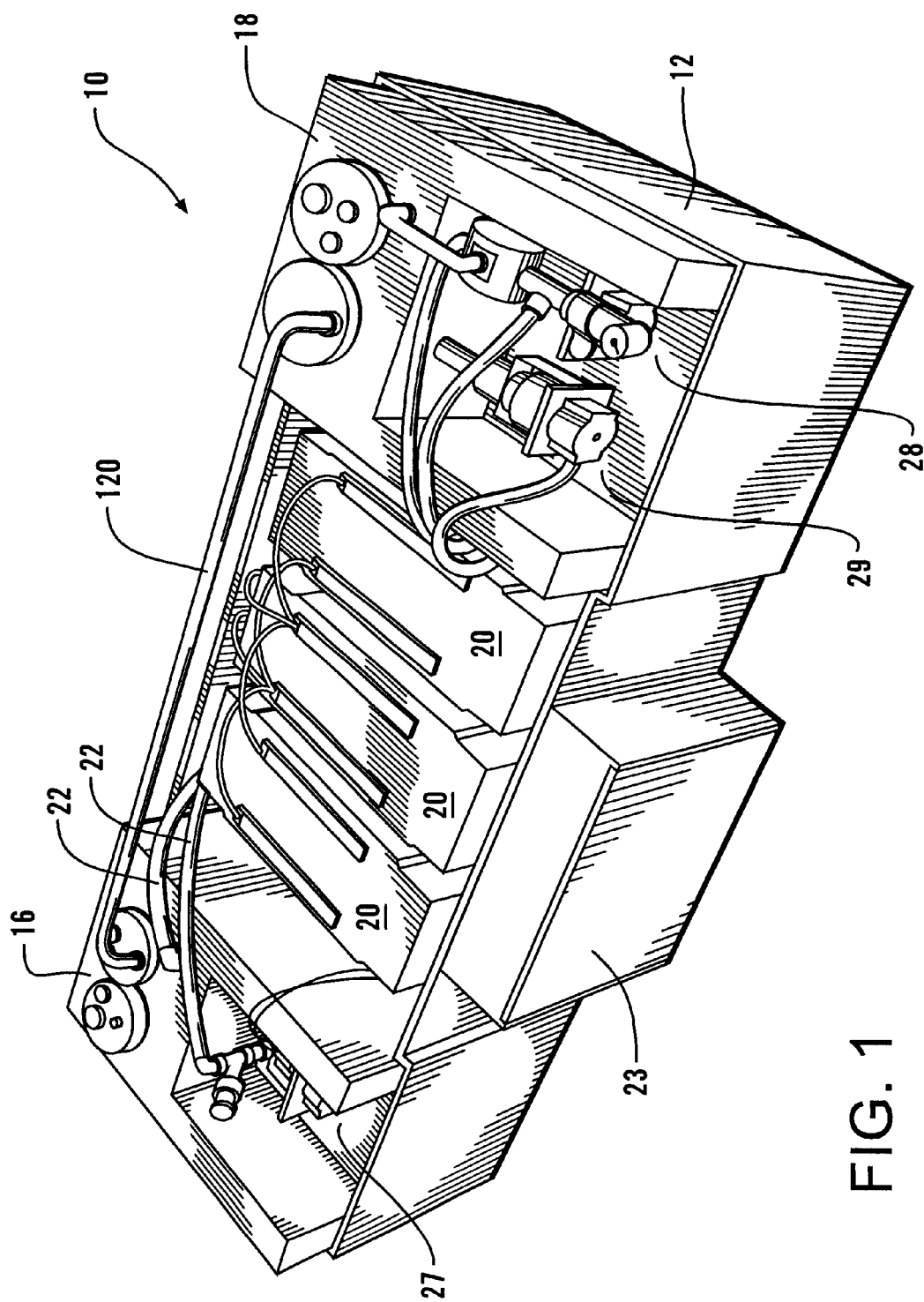
FIG. 1 is a perspective view of a battery module having reservoirs made in accordance with the teachings of the present invention.
Figure 2:
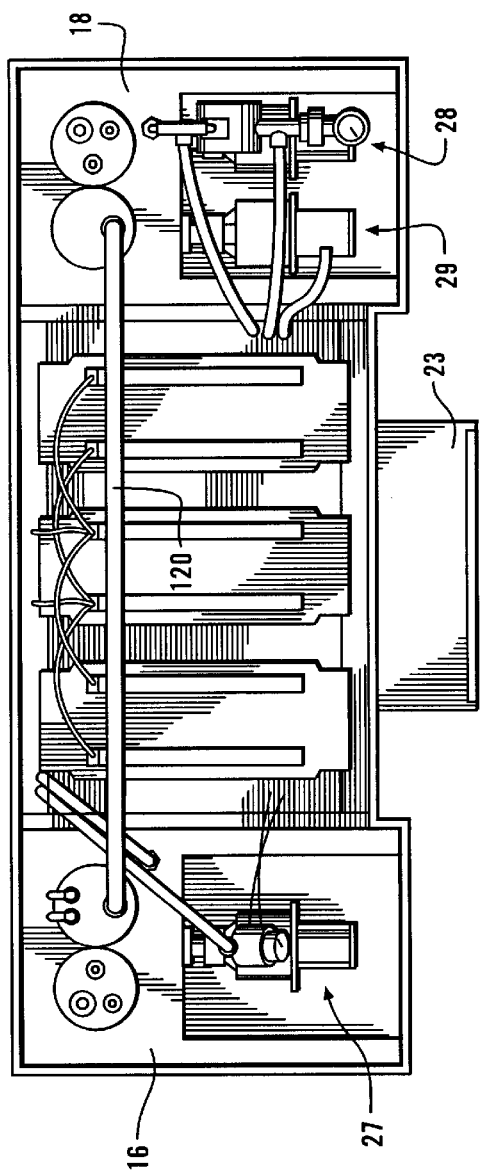
FIG. 2 is a top view of the battery module shown in FIG. 1.

A battery module 10 incorporating the features of the present invention is shown in FIG. 1. The battery module 10 includes a containment pan 12 with a cover (not shown). The pan 12 contains an anolyte reservoir 16 and catholyte reservoir 18. The reservoirs 16 and 18 are coupled to three batteries 20 through plumbing 22. Each of the batteries 20 includes a stack of electrochemical cells that stores and releases energy in a manner that is understood by those of skill in the art. When the batteries 20 are operating, electrolyte flows to and from the reservoirs 16 and 18 through the plumbing 22. Plumbing suitable for use in the present invention includes VITON® tubing. Barbed fittings and spring clamps may be used to couple the tubing to the various components of the module 10. The fittings and connections between components may be further sealed by wrapping them with TEFLON® tape.

Figure 3:
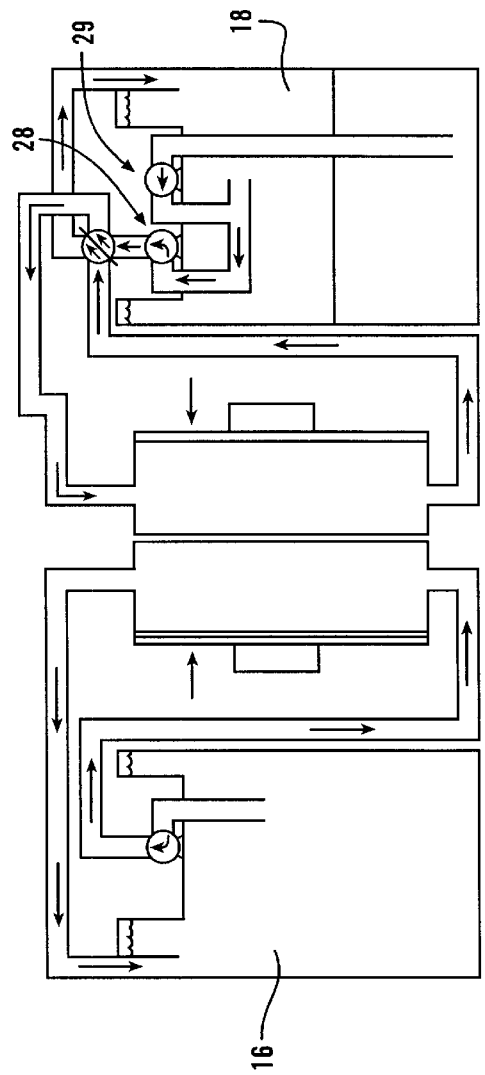
FIG. 3 is a schematic view of the present invention illustrating the flow of electrolyte through the electrochemical cells in the batteries in the battery module.
Figure 4:
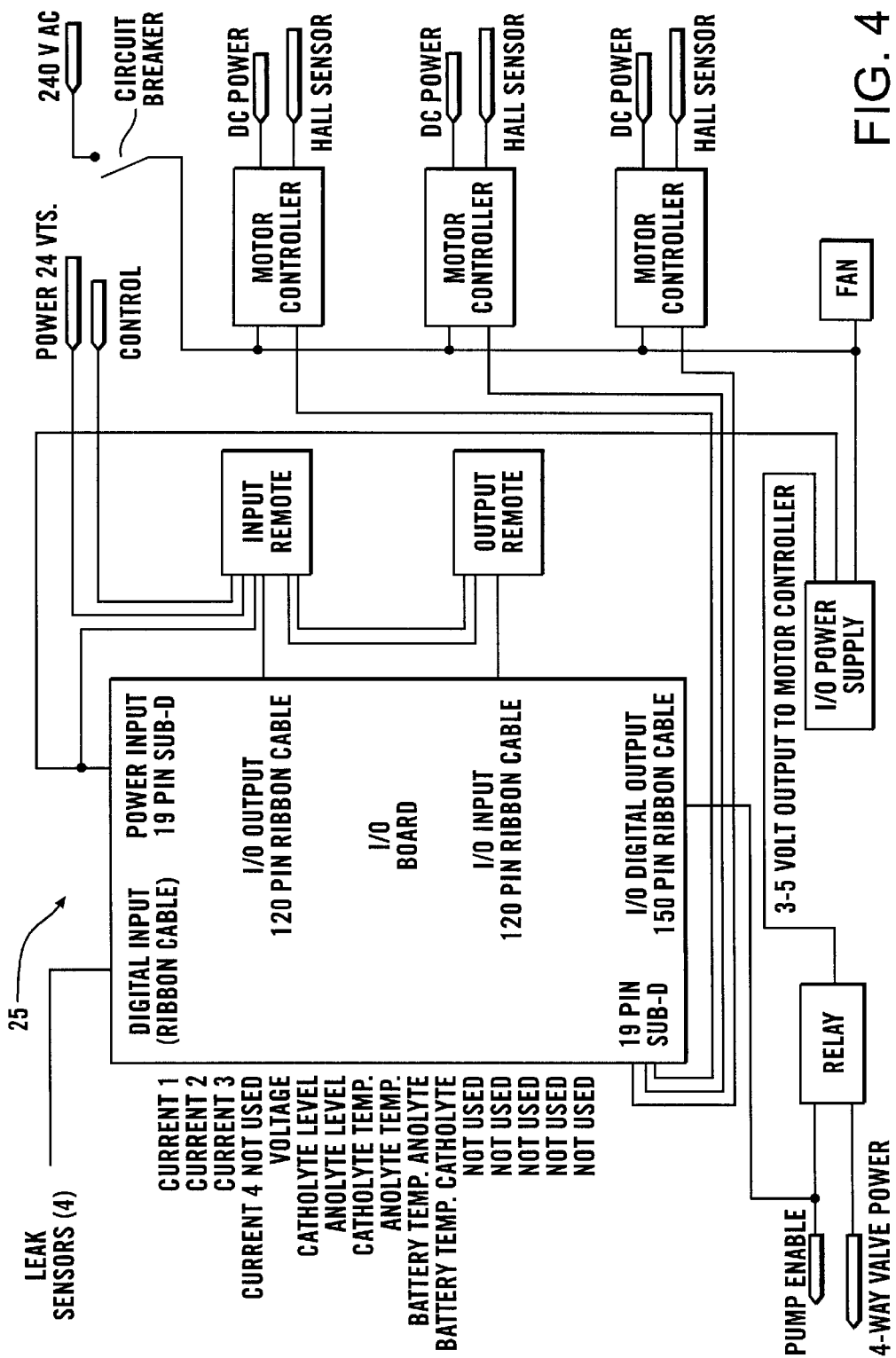
FIG. 4 is a schematic view of the controller used in the present invention.

Mounted on one side of the containment pan 12 is a cabinet 23 for housing a module controller 25 (FIG. 4). The module controller 25 is coupled to several battery sensors (some not shown) and controls an anolyte pump 27, a catholyte pump 28, and a second phase pump 29 which circulate electrolyte from the reservoirs 16 and 18 to the batteries 20, as shown schematically in FIG. 3.

Figure 5:
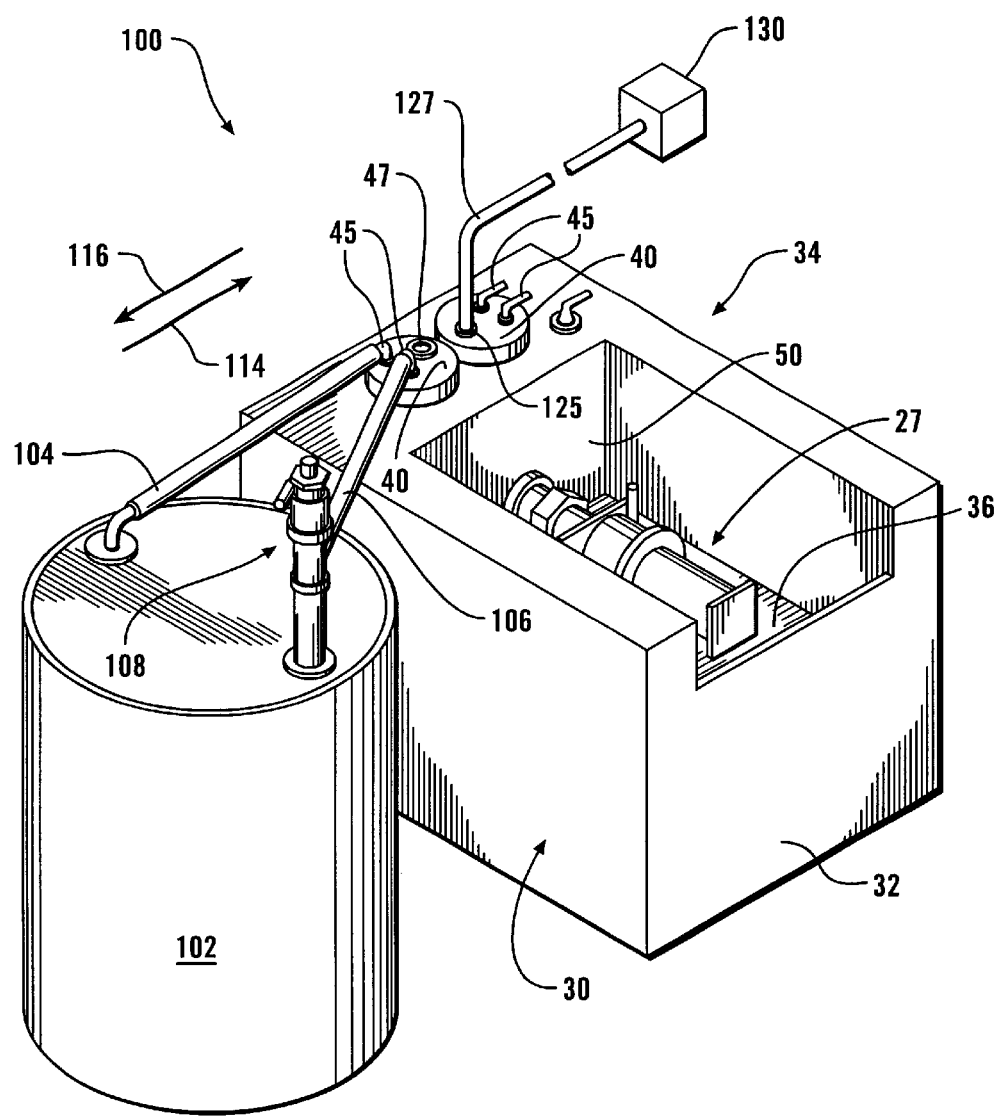
FIG. 5 is a perspective view of the anolyte reservoir coupled to an electrolyte container while the reservoir is being filled with electrolyte.
Figure 6:
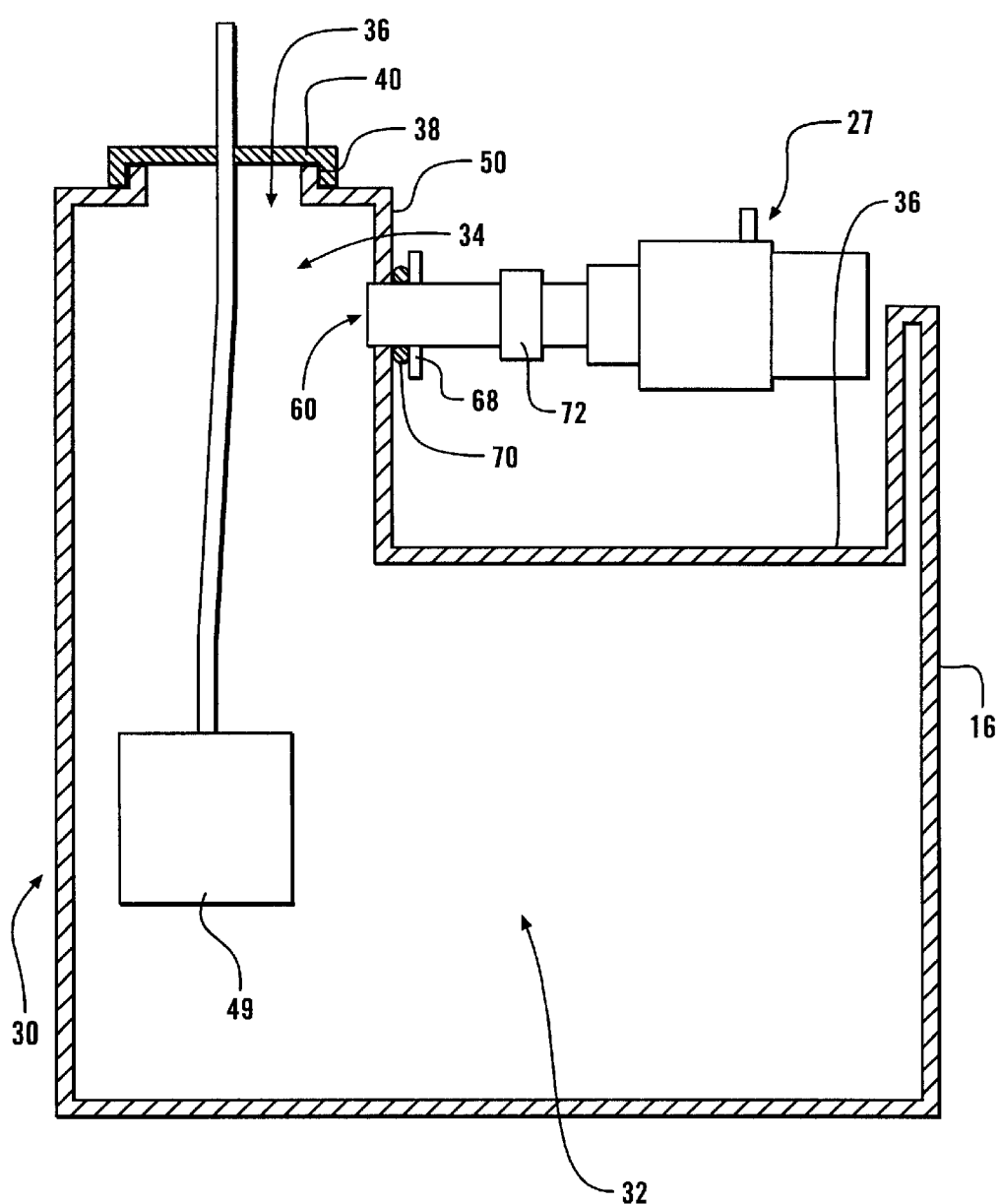
FIG. 6 is a cross-sectional view of the anolyte reservoir used in the present invention.

The reservoirs 16 and 18 share numerous identical features. Thus, for purposes of brevity, only the anolyte reservoir 16 will be discussed in detail. As best seen by reference to FIGS. 5 and 6, the anolyte reservoir 16 has a main tank 30 with a bottom portion 32 and an upper portion 34. A recessed or sump area 36 is positioned above the bottom portion 32 and adjacent the upper portion 34.

The upper portion 34 has one or more access openings 36. In the embodiment illustrated, the openings 36 are defined by raised cylindrical lips or structures 38 positioned on the top of the upper portion 34. Each of the openings 36 is sealed by one lid 40. Each lid 40 may be removably secured to the structures 38 by helical threads, snap rings or similar mechanisms. O-ring seals (not shown) may be provided in the lids or structures to ensure an airtight seal and prevent the escape of bromine vapor. Each lid 40 also has one or more openings for receiving fittings (such as elbow fittings 45), plugs (such as plug 47), or wiring for sensors such as level sensor 49 (FIG. 6) positioned inside the reservoir.

The level sensor 49 is coupled to the controller 25 and in the event of a non-normal level of electrolyte, such as too much electrolyte, the sensor will send a signal to the controller 25, which will, in turn, shut down the system 10.

The upper portion 34 of the main tank 30 has a forward facing wall 50 with an aperture 60 in which the anolyte pump 27 is mounted. The pump 27 is mounted near the top of the upper portion 34, which assures that only a minimal amount of liquid will leak from the tank 30 in the event of a breach of the seal between the pump 27 and the aperture 60. If there is a leak, the sump area 36 will entrap any fluid that does escape from the tank 30.

To reduce the possibility of leaks occurring, the pump and reservoir return line connections are made using a bulkhead configuration. For example, as best seen by reference to FIG. 6, the pump 27 is mounted to the reservoir 16 using a bulkhead 68 and a bromine resistant gasket 70 to seal the fitting in aperture 60. The functionality of the pump connection, as well as other connections, can be enhanced by using a quick-disconnect coupling, such as the coupling 72, to reduce the time required to replace pumps, motors, and other components. A coupling suitable for use in the present invention is a SERFILCO® coupling.

To further reduce bromine leaks, the present invention is designed so that it may be shipped in a dry condition, without electrolyte. Once the module 10 is at a desired location, the reservoirs 16 and 18 may be filled with electrolyte using a vapor recovery system 100. The vapor recovery system 100 includes a container such as a drum 102 filled with electrolyte, hoses 104, 106 for connecting the drum 102 to one of the reservoirs 16 and 18, and a pump/motor 108 to pump the electrolyte from the drum 102 into the chosen reservoir. As illustrated in FIG. 4, the hoses 104, 106 of vapor recovery system 100 are connected to the fittings 45. The hose 104 to returns bromine vapor back to the drum 102 (arrow 114) as the reservoir 16 is being filled with electrolyte. When emptying the reservoir, the recovery system 100 returns vapor to that reservoir (arrow 116) through the same hose. This minimizes the amount of bromine vapor that is released into the air as the reservoirs are filled or emptied.

Each reservoir 16, 18 is under pressure and that pressure changes due to the expansion and contraction of the electrolyte flowing through the module 10 and changes in ambient pressure. In order to equalize the pressure of the reservoirs 16 and 18 with the ambient pressure, a pressure equalization tube 120 (FIG. 1) is coupled between the anolyte reservoir 16 and the catholyte reservoir 18. To accomplish equalization with ambient pressure and allow air to enter or exit the anolyte reservoir 16, an opening 125 to atmospheric pressure is made through one of the lids 40 on the anolyte reservoir unit 16 and a tube 127 attached to the opening 125 is connected to a bromine filter 130 (shown schematically) which contains a substance that neutralizes and/or collects bromine. The opening 125 also allows for the escape of any hydrogen that may be built up in the system.

Use of the Battery Module

As noted above, to facilitate transportation of the module 10 to a desired location, it is shipped in a dry condition without electrolyte. Electrolyte is transported separately by tanker truck or similar means. To assemble the module 10, the batteries 20 are aligned on a frame (not shown), plumbing hoses are connected to fittings on the batteries 20, and the frame and batteries are placed into the containment pan 12 between the reservoirs 16 and 18. The plumbing hoses are then connected to the reservoirs.

Preferably, the reservoirs 16 and 18 are filled with electrolyte using the vapor recovery system 100 illustrated in FIG. 4. Once the reservoirs 16 and 18 are filled, the vapor recovery system 100 is disconnected from the module 10 and the anolyte and catholyte pumps are started so that electrolyte is introduced into the batteries 20. Once the batteries are filled with electrolyte, they are inspected for leaks and if leaks are detected they should be repaired as appropriate. If no leaks are observed, the battery module may be put into use.

While the containment system and other components noted above have been described in reference to the specific embodiments shown in the drawings and the description provided herein, the specifics of the drawings and description are not meant to limit the scope of the invention. It should be understood that many variations and modifications may be made to the details provided while remaining within the spirit and scope of the invention. Further, the invention herein described is related to the subject matter disclosed in U.S. Pat. Nos. 5,610,802; 5,650,239; 5,626,986; 5,600,534; 5,591,538; 5,605,771; and 5,601,943. The disclosures of the cited references are incorporated by reference herein.

What is claimed is:

1. A spill and leak containment system for a liquid electrolyte battery, the system comprising:

a one-piece electrolyte reservoir having a main tank with a bottom portion, an upper portion, and a sump positioned above the bottom portion and adjacent to the upper portion, the upper portion having at least two openings, and wherein a first pump is mounted in the sump; and a vapor recovery assembly having
      an electrolyte container with first and second openings,
      a second pump mounted in the first opening in the container,
      a first hose for coupling the second pump to one of the two openings in the electrolyte reservoir, and
      a second hose for coupling the second opening in the electrolyte container to the other opening in the electrolyte reservoir.

2. A spill and leak containment system as in claim 1, wherein the electrolyte reservoir includes an aperture for being coupled to a pressure equalization line connected to a second electrolyte reservoir.

3. A spill and leak containment system as in claim 1, wherein the upper portion of the main tank has a forward facing wall with an aperture.

4. A spill and leak containment system as in claim 3, wherein the first pump is aligned with the aperture in the forward facing wall and above the sump.

5. A spill and leak containment system as in claim 1, wherein the first pump is coupled to the electrolyte reservoir using a quick-connect coupling.

6. A spill and leak containment system for a liquid electrolyte battery, the system comprising:

a one-piece reservoir having a main tank with a bottom portion, an upper portion, and a recessed portion positioned above the bottom portion and adjacent to the upper portion, the upper portion having at least one opening; and a vapor recovery assembly having
      an electrolyte container,
      a pump mounted in fluid communication to the container,
      a bidirectional connection between the reservoir and the vapor recovery system
   whereby the same liquid electrolyte may be transferred between the reservoir and electrolyte container in a first direction and vapors may be transferred between the reservoir and electrolyte container in a second direction, opposite the first direction.

7. A spill and leak containment system as in claim 6, wherein the reservoir includes a pressure equalization aperture, and further comprising a second one-piece reservoir with a pressure equalization aperture, a pressure equalization line connected between the two pressure equalization apertures, and a containment pan sized and shaped to hold the two reservoirs.

8. A spill and leak containment system as in claim 6, wherein the upper portion of the main tank has a forward facing wall with an aperture.

9. A spill and leak containment system as in claim 8, the system further comprising an electrolyte pump aligned with the aperture in the forward facing wall and above the recessed area.

10. A spill and leak containment system as in claim 6, wherein the recessed area is capable of holding an amount of liquid.

11. A spill and leak containment system as in claim 6, wherein the upper portion of the main tank has one or more access openings, and a lid for covering each access opening.

12. A spill and leak containment system as in claim 11, where in each lid has one ore more openings.

13. A spill and leak containment system as in claim 6, wherein the reservoir has an opening to allow air to enter and exit the reservoir, the opening coupled to a bromine filter.

* * * * *